United States Patent [19]

Braunschweig et al.

[11] Patent Number: 4,734,724
[45] Date of Patent: Mar. 29, 1988

[54] METHOD AND ARRANGEMENT FOR THE AUTOMATIC CONTROL OF AERIAL PHOTOGRAPHIC CAMERAS

[75] Inventors: Thomas Braunschweig, Jena; Bernard Beck; Norbert Diete, both of Jena-Lobeda, all of German Democratic Rep.

[73] Assignee: Jenoptik Jena GmbH, Jena, German Democratic Rep.

[21] Appl. No.: 899,194

[22] Filed: Aug. 22, 1986

[30] Foreign Application Priority Data

Oct. 2, 1985 [DD] German Democratic Rep. .................................... 2813245

[51] Int. Cl.⁴ .............................................. G03B 39/00
[52] U.S. Cl. ........................................ 354/66; 354/70
[58] Field of Search ........................... 354/65, 70, 66

[56] References Cited

U.S. PATENT DOCUMENTS 3,703,999 11/1972 Forys et al. ................... 354/70 X
3,997,795 12/1976 Pohl et al. .................... 354/66 X
4,600,283 7/1986 Görsch et al. .................... 354/66

FOREIGN PATENT DOCUMENTS 2506325 11/1975 Fed. Rep. of Germany ........ 354/65

Primary Examiner—Michael L. Gellner
Attorney, Agent, or Firm—Jordan and Hamburg

[57] ABSTRACT

A method and an arrangement for the automatic control of aerial photography cameras, in which a lens portrays the terrain overflown on a projected area, at least two photodetector rows being disposed on the projected area perpendicularly to the direction of motion of the terrain image and the direction and speed of motion of the terrain image on the projected area, the drift and the $v_g/h_g$ ratio being determined from the signals of the photodetector. The method eliminating errors in the determination of $v_g/h_g$ and drift, which are caused by tilts ($\omega$) about the aircraft longitudinal and lateral ($\psi$) axes. For this purpose the tilt ($\omega$, $\psi$) of the aircraft is determined simultaneously with reading the photodetector rows and taken into consideration in the evaluation of the signals of the photodetectors.

8 Claims, 2 Drawing Figures

METHOD AND ARRANGEMENT FOR THE AUTOMATIC CONTROL OF AERIAL PHOTOGRAPHIC CAMERAS

The invention relates to a method and an arrangement for the automatic control of aerial photography cameras, for which at least the ratio of the ground speed to the height above ground ($v_g/h_g$) and the drift are determined and from this data the control data for the on-time triggering of the camera to achieve constant image coverage for sequential photographs as well as to compensate for the drift is derived.

Automatic control instruments for aerial cameras are known. In U.S. Pat. No. 3,997,795 a control instrument is described which, in the projected area of a lens, contains two mutually separate digital photodetector matrices with four rows each, with which an information processing stage, which calculates the image sequence interval, the drift and further settings of the camera, is connected in series and which controls the aerial camera with these values.

In U.S. Pat. No. 4,600,283 a control instrument is described, which has in the projected area at least two photodetector rows, which run perpendicular to the direction of motion of the terrain image and to which a memory and a correlation circuit are connected in series, with the help of which the image sequence interval and the drift are determined.

The mode of operation of the known solutions is based on determining the magnitude of the displacement of identical picture structures over the projected area, which is determined by correlation of the brightness values of the terrain, which are supplied by the two photodetector rows (matrices) at different times. Knowing the distance between the two rows, the time in which an picture structure migrates from the one row to the other, is a measure of the $v_g/h_g$ ratio, while the displacement of the structure within the line (lateral displacement) is a measure of the drift.

The known solution with two parallel rows (matrices) have the disadvantage that the determination of $v_g/h_g$ and of the drift during sudden movements of the aircraft about its longitudinal or lateral axes, such as occur almost constantly due to turbulences, flight corrections, etc., works very erroneously or even fails completely. To solve this problem, it was proposed in U.S. Pat. No. 4,600,283 to dispose a third row in the projected area parallel to the direction of motion of the terrain image, said third row having its own correlator, with the help of which a "differential" $v_g/h_g$ is determined. This solution requires an appreciable additional expenditure (3rd row) and provides a remedy only for the $v_g/h_g$ determination. The tilting of the aircraft about its longitudinal axis causes a sudden decrease in the correlation factor of the data of the third row; this, however, occurs also when the aircraft drifts, so that there is no possibility of separating the two causes and thus of stating the effect of tilting on the result of the drift determination. In such cases, the only possibility remaining is not to use the drift, which has been calculated, to control the camera and to start the cycle of determining the drift once again. The efficiency of the control instrument thus is very restricted.

It is an object of the invention to ensure the correct functioning of an automatic control instrument even under unfavorable flight conditions and thus to make a contribution to reducing the personnel effort during photo missions and to increase the quality of the picture material obtained.

The task of the invention is provide a method and an arrangement for the automatic control of an aerial photography camera, which supplies correct values for the $v_g/h_g$ ratio and the drift even when the aircraft moves suddenly about its longitudinal or lateral axis.

In accordance with the invention, this objective is accomplished by a method for the automatic control of aerial photography cameras, in which the displacement of a terrain image on a projected area is determined by means of comparison (correlation) of the image data from two photodetector rows disposed on the projected area essentially perpendicularly to the direction of motion of the terrain image, the image data of the row lying in front in the direction of motion of the terrain image being stored temporarily and compared in a time-slot pattern with the image data of the second photodetector row and the ratio $v_g/h_g$ being determined from time determined for the shift of identical picture structures from the first to the second row and the drift being determined from the shift along the direction of the rows and these values being converted into control data for the aerial camera, in that essentially in the same time-slot pattern at least the magnitude of the tilt of the aircraft about its longitudinal axis is determined, the corresponding shift of the image of the picture structure is calculated from the magnitude of this tilt and the shift caused by the tilt is taken into consideration for the comparison of the image data of the two rows. It is moreover advantageous to determine from the magnitude of the tilt the part of the image data which can contain identical picture structures, and to use only this part for the comparison. The number $\bar{n}$ of the pixels of this part is advantageously calculated from the formula $$\bar{n} = \frac{n}{2}\left[1 - \frac{\tan(\omega - \sigma)}{\tan\sigma}\right]$$

in which n is the total number of pixels, $\sigma$ is the image angle of the photodetector rows and $\omega$ is the calculated tilt.

An advantageous refinement arises if, furthermore, the tilt of the aircraft about its lateral axis is determined in the same time-slot pattern, the corresponding shift of the image of the picture structure is calculated from the magnitude of this tilt, a correction value for the speed of motion of the terrain image is formed from this shift and this correction value is taken into consideration for the determination of the $v_g/h_g$ ratio.

The arrangement in accordance with the invention for the automatic control of an aerial photography camera has at least two photodetector rows, which are disposed in the projected area of a lens preferably perpendicularly to the direction of motion of the terrain image, as well as a signal processing unit, which is connected in series with the photodetector rows and comprises at least a master clock, an intermediate storage unit for the image data supplied by the photodetector rows, a correlator circuit and a trigger pulse generating circuit, the signal processing unit furthermore containing a data correction circuit, which is connected with sensors to determine the magnitude of the tilts about the longitudinal and lateral axes of the aircraft. Advantageously, the data correction circuit comprises a computing circuit, which calculate the number of pixels, the image data of which can represent identical picture structures, from the formula $$\bar{n} = \frac{n}{2}\left[1 - \frac{\tan(\omega - \sigma)}{\tan\sigma}\right]$$

as well as a selection circuit, which is connected with the correlator circuit, which releases only the image data, so determined, to the correlator circuit.

The sensors may be, for example, angular velocity probes, to which integrators are connected in series, which are connected electrically with the data correction circuit, as well as with the master clock. However, other suitable angle probes may also be used.

It is advantageous if the signal processing unit comprises at least one microcomputer with appropriate peripheral components and if the method of the invention is realized by suitable programming.

The advantage of the invention is therein that errors of the conventional optoelectronic determination of drift or of the $v_g/h_g$ ratio, caused by the tilting of the aircraft about its longitudinal or lateral axis, are eliminated by taking into consideration the image shift brought about thereby and by using for the correlation only the image data which represents identical terrain structures. Moreover, this measure results in a sharper maximum for the correlation and thus in an increase in the accuracy of the measured values used to control the aerial photography camera.

The invention will now be explained with reference to a preferred example of the operation thereof.

Figure 1:
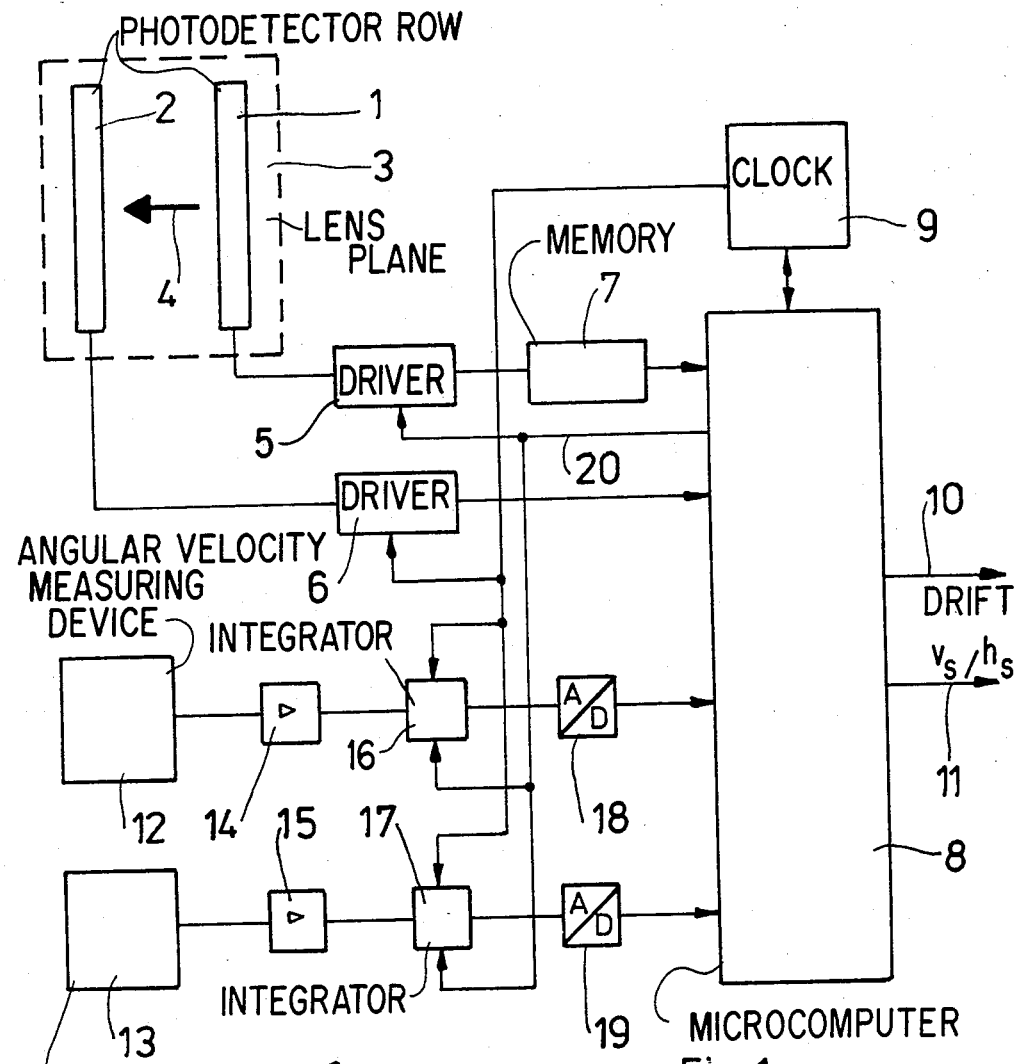
FIG. 1 shows a block circuit diagram of the arrangement of the invention.

In FIG. 1, there are two photodetector rows 1, 2 on the projected plane 3 of a lens, which is not shown here. The arrow 4 indicates the direction of motion of the terrain image projected on the projected area 4. A driver circuit 5,6, which also contains sample and hold amplifiers and analog/digital convertors is connected in series to each of the rows 1 and 2. The driver circuit 5 of the row 1 is furthermore connected in series with a memory 7. The memory 7 and the driver circuit 6 are connected to a microcomputer 8, which is clocked by a master clock 9. The computer 8 has outputs 10, 11 for the drift and the $v_g/h_g$ ratio. Amplifiers 14, 15, integrators 16, 17 and analog/digital convertors 18, 19 are connected in series with two angular velocity measuring devices 12, 13, which are disposed in the aircraft so that they react to tilting about the longitudinal axis of the aircraft ($\omega$) and about the lateral axis of the aircraft ($\psi$). The data output of the analog/digital convertors 18, 19 is applied to appropriate inputs of the computer 8. The master clock 9 has connections to the driver circuit 6 and the integrators 16, 17.

The method of the invention for automatically controlling an aerial photograph will be explained now in greater detail with reference to this example of the operation.

At the start, the computer causes the photo detector row 1 to be read over a signal line 20 and the image data, converted to digital values, to be stored in the memory 7. In addition, the pending values in the integrators 16, 17 are reset. At the same time, the master clock 9 is triggered to produces pulses in a regular time-slot pattern of, for example, 50 ms and to deliver these to the driver circuit 6 as well as the integrators 16, 17. For each of these pulses, the row 2 is read and the image data, converted into digital values, is supplied to the computer. At the same time, the angle values, pending in the integrators 16, 17 after the integration of the angular velocity during the time between the pulses and converted by means of the analog/digital convertors 18, 19 into digital values, are delivered to the computer 8.

The computer 8 now calculates the angle of tilt $\omega$ about the longitudinal axis according to the formula $$\bar{n} = \frac{n}{2}\left[1 - \frac{\tan(\omega - \sigma)}{\tan\sigma}\right]$$

Figure 2:
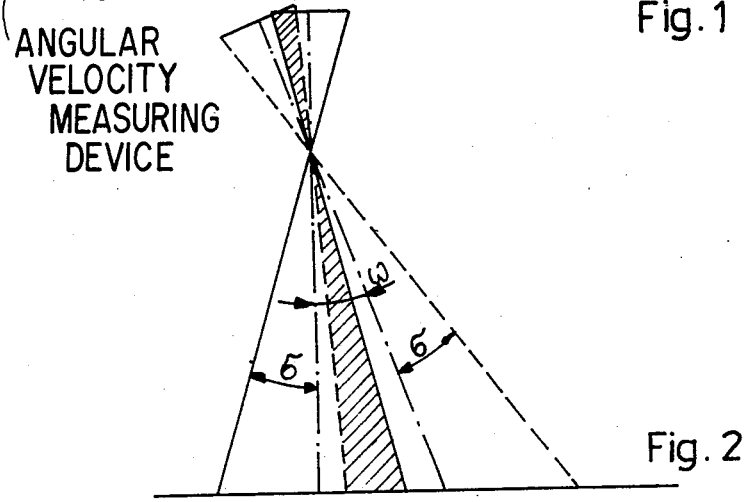
FIG. 2 shows a sketch to illustrate the geometric relationships when the aircraft tilts about an axis.

The number of pixels of the two rows, which in the absence of drift have identical picture structures, are disregarded. The geometrical relationships for this are shown in FIG. 2; the hatched parts shows the part of the image, which is portrayed on both rows. In this connection, n is the total number of pixels and $\sigma$ is the image angle of the two rows. The formula is an approximation, which disregards the stretching of the terrain structure, portrayed on a pixel, in the event that the row and the terrain are not parallel to one another; because of the factor $1/\cos\omega$, this is entirely permissible when $\omega$ is less than 10° (the maximum value that occurs in practice). As is also evident from FIG. 2, the pixels, suitable for the comparison of the image data, are always at opposite ends of the two rows; which end is to be used as a basis is determined by the algebraic sign of $\omega$. With the image data sequences, so determined, the comparison (correlation) between the image data, stored in the memory 7, with that actually coming in from row 2 is now carried out in computer 8 in the time-slot pattern defined by the master clock 9; this means that, in each case, the effect of the tilting about the longitudinal axis on the "field of view" of row 2 is taken into consideration before the correlation. The correlation factors obtained are stored and compared with the previous correlations in order to find the maximum agreement in this manner. Methods suitable for this are known; for example, the method given in the U.S. Pat. No. 4,600,283 may be used. If the correlation maximum is reached, this means that the terrain image has now moved from row 1 to row 2. From the time required for this (that is, from the number of the cycles of the time-slot pattern) and the distance between the rows 1 and 2, the $v_g/h_g$ ratio is determined. For the $v_g/h_g$ determination, the image shift, caused by any tilting $\psi$ about the lateral axis about the aircraft, is taken into consideration by adding this image shift to the fixed distance between the two rows for the $v_g/h_g$ determination, so that a corrected distance value goes into the calculation in each case. This $v_g/h_g$ ratio and the drift of the two image data sequences relative to each other, determined by the method given above, are supplied over the outputs 10 and 11 of the computer to the aerial camera. Subsequently, the whole cycle commences once again with the reading in of image data from row 1 in memory 7 and the resetting of the values pending in the integrators 16, 17.

The realization of the invention is not restricted to the example of the operation, which has been described. For example, the tilt about $\psi$ may also be adequately taken into consideration by the "differential" determination of the $v_g/h_g$ ratio described in the U.S. Pat. No. 4,600,283. Other suitable system, such as a gyroscope, an artificial horizon, etc., may also be used as sensors; more particularly, it is possible to make do with the systems present to begin with in the aircraft for navigation. Moreover, it is immaterial whether only the numerical values for $v_g/h_g$ and drift or immediately the required control pulses for the aerial photograph camera are formed with computer 8.

We claim:

1. In the method for the automatic control of aerial photography cameras, in which the displacement of a terrain image on a projected area is determined by comparing the image data from two photodetector rows disposed on a projected area essentially perpendicularly to the direction of motion of the terrain image, storing the image data of the row lying in front in the direction of motion of the terrain image temporarily and comparing it in a time-slot pattern with the image data of the second photodetector row and deterimining the ratio $v_g/h_g$ from the time determined for the shift of identical picture structures from the first to the second row and determining the drift from the shift along the direction of the rows and converting these values into control data for the aerial camera, the improvement wherein essentially in the identical time-slot pattern, determining at least the magnitude of the tilt ($\omega$) of the aircraft about its longitudinal axis, calculating the corresponding shift of the image of the picture structure from the magnitude of this tilt ($\omega$) and taking into consideration the shift caused by the tilt ($\omega$) in the comparison of the image data of the two rows.

2. Method for the automatic control of aerial photography cameras as defined in claim 1, comprising determining the portion of the image data of the two rows which contains identical picture structures from the magnitude of the tilt ($\omega$) of the aircraft and employing only this portion of the image data for the comparison.

3. Method for the automatic control of aerial photography cameras as defined in claim 2, wherein the number $\bar{n}$ of the pixels of the two rows, the image data of which represents identical picture structures, is calculated from the formula $$\bar{n} = \frac{n}{2}\left[1 - \frac{\tan(\omega - \sigma)}{\tan\sigma}\right]$$

in which n is the total number of the pixels in the rows, $\sigma$ is the image angle of the photodetector rows and $\omega$ is the tilt that has been determined.

4. Method for the automatic control of aerial photography cameras as defined in claim 1, further comprising determining the tilt ($\omega$) of the aircraft about its lateral axis in the same time-slot pattern (9), calculating the corresponding shift of the image of the picture structure from the magnitude of this tilt ($\omega$), forming a correction value for the speed of motion of the terrain image from this shift, and taking this correction value into consideration for the determination of the $v_g/h_g$ ratio.

5. In an arrangement for the automatic control of aerial photography cameras, comprising at least two photodetector rows disposed in a projected area of a lens preferably perpendicularly to the direction of motion of a terrain image, a signal processing unit which comprises at least one master clock, an intermediate storage unit for the image data supplied by the photodetector rows, a correlator circuit and a trigger pulse generating circuit connected in series with the two photodetector rows, the improvement wherein the signal processing unit has a data correction circuit connected to sensors for determining the magnitude of the tilts ($\omega$) about the longitudinal and lateral ($\psi$) axes of the aircraft.

6. Arrangement for the automatic control of aerial photography cameras as defined in claim 5, wherein the data correction circuit has a computing circuit which determines the number of pixels, the image data of which represent identical picture structures, from the formula $$\bar{n} = \frac{n}{2}\left[1 - \frac{\tan(\omega - \sigma)}{\tan\sigma}\right]$$

as well as a selection circuit is connected the correlator circuit and which delivers only the data so determined to the correlator circuit.

7. Arrangement for the automatic control of aerial photography cameras as defined in claim 5, wherein angular velocity probes are provided as sensors, and integrator means connected electrically to the data correction circuit as well as to the master clock, are connected in series with the angular velocity probes.

8. Arrangement for the automatic control of aerial photography cameras as defined in claim 5, wherein the signal processing unit comprises at least one microcomputer.

* * * * *